Figure 1:
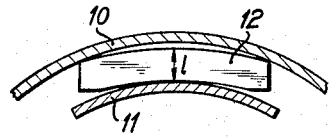

Feb. 8, 1966  G. WEITBRECHT  3,234,416
MAGNETO ROTOR AND METHOD OF MANUFACTURING THE SAME
Filed Dec. 4, 1962

OLD ART

INVENTOR
Gerhard Weitbrecht
by
Michael S. Striker
Atty

United States Patent Office 3,234,416
Patented Feb. 8, 1966

3,234,416
MAGNETO ROTOR AND METHOD OF
MANUFACTURING THE SAME
Gerhard Weitbrecht, Stuttgart-Botnang, Germany, assignor to Robert Bosch G.m.b.H., Stuttgart, Germany
Filed Dec. 4, 1962, Ser. No. 242,247
Claims priority, application Germany, Dec. 9, 1961,
B 65,116
4 Claims. (Cl. 310—153)

The present invention concerns a magneto rotor and a magnet member incorporated therein as well as a method of manufacturing a magneto rotor, particularly of the type applying to what is known as a flywheel magneto or flywheel magneto lighting generator. In magnetos or generators of this type an annular soft iron support member is provided for completing the magnetic circuit for permanent magnet members preferably made of oxidic magnetic material attached to the inner surface of the annular support member and equipped with part-cylindrical soft iron pole members attached to the inner face of the magnet members.

In manufacturing or forming the magnet members irregularities in the curvature thereof are likely to occur, particularly if the magnet members are produced by sintering of blanks made of oxidic magnetic material because in the sintering operation the material shrinks in such a manner that the reduction in size of the radii of the curved faces of the magnet member blank varies more than that of the other dimensions thereof. This entails the undesirable result that the thus-formed magnet members do not fit exactly with their curved faces the respectively adjacent inner surface of the annular support member and the outer face of the pole members, or both, so that a hollow space remains either between the magnet members and the support member or between the magnet member and pole member.

As the curvature of the faces of the magnet member varies also the magnitude of the air gap across the magnetic circuit varies whereby accordingly the magnetic efficiency of such a magnetic system varies. In addition, since the magnet members are subjected to some pressure when they are assembled with the annular support member, the magnet members frequently break if there is a hollow space between the supporting surface and the adjacent face of the magnet member.

It is therefore one of the objects of this invention to provide for a method of manufacturing magneto rotors of the type set forth wherein the above described difficulties are overcome.

It is another object of this invention to provide for a magneto rotor of the above type in which type solid contact between the magnet members and the supporting member as well as with the pole member is assured.

It is still another object of the invention to provide for a magnet member adapted to be used in a magneto rotor of the above nature which is so shaped that the above mentioned difficulties are eliminated.

With above objects in view a method according to the invention of manufacturing a magneto rotor comprises the steps of manufacturing an annular support member having a cylindrical inner surface of a predetermined first radius; making a pole member shaped substantially as a segment of a cylinder and having a cylindrical outer surface of a predetermined second radius smaller than said first radius; forming a magnet member blank having an outer part-cylindrical curved face of a third radius only slightly differing from said first radius but substantially larger than said second radius, and an inner part-cylindrical curved face having a fourth radius slightly larger than said second radius but substantially smaller than said first radius, and having substantially in the center portion thereof a thickness substantially equal to the difference between said first and second radii while its thickness is smaller in the remaining portions thereof; subjecting said magnet member blank to a treatment during which said blank is slightly deformed in its curvature in such a manner as to obtain a finished magnet member the radius of the outer face of which does not exceed said first radius of said inner surface of said support member and the radius of the inner surface of which is at least equal to said second radius of the outer surface of said pole member; and concentrically assembling said pole member within said annular support member with said finished magnet member, the latter being interposed between said inner surface of said annular support member and said outer surface of said pole member, whereby in the finished magneto rotor assembly the finished magnet member is always in its center portion in direct contact with said inner surface of said supporting member and said outer surface of said pole member, respectively, while any space that may be left between said surfaces and said faces of the magnet member will be restricted to the portions at both sides of said center portion of said magnet member.

In another aspect of the invention it includes a magneto rotor which comprises, in combination, an annular support member having a cylindrical inner surface of a predetermined first radius and having a first axis; a pole member shaped substantially as a segment of a cylinder and having a cylindrical outer surface of a predetermined second radius and having a second axis parallel with said first axis; and a magnet member of predetermined width and length, curved in longitudinal direction and bounded transversely by a first, cylindrical surface portion having a third predetermined radius not exceeding said first radius and having a third axis parallel with said first and second axes, and by a second cylindrical surface portion having a predetermined fourth radius smaller than said third radius and at least equal to said second radius and having a fourth axis, said third and fourth axes being parallel with each other and spaced from each other a distance of such magnitude that the radial thickness of said magnet member is greater in the center area thereof than on both sides thereof, said pole member being fitted between said inner surface of said support member and said outer surfaces of said pole member, whereby the magnet member will be engaged by said surfaces of said support member and of said pole member, respectively, always at least in said center area, and any space left between the cylindrical surfaces of the magnetic member and the respectively adjacent surfaces of the support and pole members will be restricted to surface portions spaced from said center area of the magnet member.

In still another aspect of the invention it includes a magnet member of predetermined width and length, curved in longitudinal direction and bounded transversely by a first cylindrical surface portion having a first predetermined radius and a first axis, and by a second cylindrical face portion having a predetermined radius smaller than said first radius and a second axis, said first and second axes being parallel with each other and spaced from each other a distance of such magnitude that the radial thickness of said magnet member is greater in the center area thereof than in the areas on both sides thereof, so that if the magnet member is fitted with its curved surface portions between adjoining member having each a cylindrical contacting surface, respectively, with axes parallel to said first and second axes, one of said contacting surfaces having a radius at least equal to said first radius of said surface of the magnet member, the other contacting surface having a radius not exceeding said second radius of said surface of the magnet member, the magnet member will be engaged by said contacting surfaces of said adjoining members always at least in said center area, and any space that may be left between the cylindrical surfaces of the magnet member and the respectively adjacent contacting surfaces of the adjoining members will be restricted to surface portions spaced from said center area of the magnet member.

Figure 2:
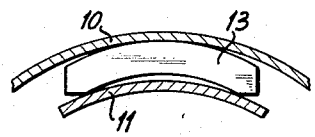
Figure 3:
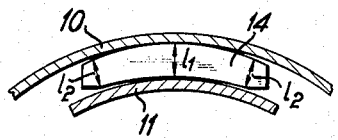
Figure 4:
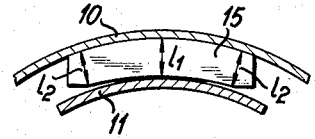
Figure 5:
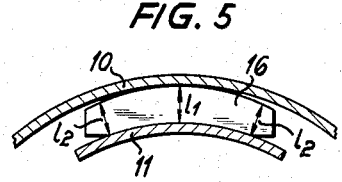

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIGS. 1 and 2 are fractional cross sections of a portion of a magneto rotor illustrating the defects that are likely to occur with a construction according to the prior art; and FIGS. 3, 4 and 5, are similar fractional cross sections of magneto rotors and magnet members in accordance with the invention, illustrating specifically three different possible cases of engagement between the components of the rotor.

In FIGS. 1–5 a portion of an annular support member 10 which may be part of a flywheel is shown as having an inner cylindrical surface of a given radius. Similarly, in FIGS. 1–5 a pole member 11 is shown being formed substantially as a segment of a cylinder and having an outer face having a given radius substantially smaller than the radius of the inner surface of the support member 10. The various elements 12–16 are magnet members of a shape described further below and interposed between the supporting member 10 and the respective pole member 11. Assuming that the magnet members 12–16 are made of sintered oxidic magnetic material the different shapes of these magnets illustrated in FIGS. 1–5 are the result of different amounts or effects of shrinkage as a result of the sintering treatment.

In FIGS. 1 and 2 which represent the old art, the magnet members 12 and 13 are both so formed that at least in the blank the outer and inner faces are constituted by concentric cylindrical surfaces so that the radial thickness 1 is uniform over practically the entire circumferential length of the piece. In the case of FIG. 1, the shrinkage of the magnet member 12 is shown to have the effect that the radius of the outer face of the member 12 is larger than the radius of the adjacent inner surface of the support member 10, while the radius of the inner face of the member 12 is larger than the radius of the outer surface of the pole member 11. Consequently, the center portion of the member 12 is not in engagement with the opposite inner surface of the supporting member 10 leaving a hollow space therebetween. In the case of FIGURE 2 the member 13 is so deformed that the radius of the inner face of the member 13 is smaller than the radius of the adjoining outer surface of the pole member 11. Therefore a hollow space remains between these two surfaces. None of this is the case in the examples illustrating the invention in FIGS. 3–5. Here the construction is such that the inner surface of the supporting member 10 has a predetermined radius of a given magnitude, and the outer surface of the pole member 11 has a substantially smaller radius, the axes of these two cylindrical surfaces being parallel and preferably coincident. The radius of the magnet member 14–16, respectively, does never exceed the radius of the inner surface of the supporting member 10, and the smaller radius of the inner face of the member 14–16, respectively, is never smaller than the radius of the outer surface of the pole member 11. The axes of the outer and inner cylindrical faces of the member 14–16, respectively, are parallel with each other but spaced in such a manner that the thickness $1_1$ in the central region or portion of the magnet member is larger than in the remaining portions thereof on both sides of the central portion as indicated at $1_2$.

Thus, it can be seen that even the shrinkage of the magnet member blank differently affecting the curvature thereof can never prevent the central portion of the thickness $1_1$ from solidly engaging both the inner surface of the supporting member 10 and the outer surface of the pole member 11. The thickness $1_1$ is always equal or at least substantially equal to the difference between the radius of the inner surface of the supporting member 10 and the radius of the outer surface of the pole member 11. Wherever an empty space remains between one or the other face, or both faces, of the member 14–16, respectively, on one hand, and the opposite outer surface of the pole member 11 and/or the inner surface of the supporting member 10, these spaces are restricted to the portions on the sides of the central portion of the particular magnet member.

Consequently, in assembling the magneto rotor a breakage of the magnet members is safely avoided.

An additional advantage of the invention resides in the fact that the air gap in the magnet circuit between the pole member 11 and the supporting member 10 is not irregular and unpredictable as in the cases illustrated by FIGS. 1 and 2, but is necessarily of constant magnitude through a series of assembled rotors because this air gap can only have a magnitude $1_1$–$1_2$.

In practice, it is advisable to predetermine the magnitude of this air gap namely the difference $1_1$–$1_2$ in such a manner that this difference is of a range of magnitude up to 12% of the central thickness $1_1$.

It does not appear to be necessary to describe in detail the steps of manufacture to be carried out in order to produce a magneto rotor. According to experience gathered in manufacturing magnet member blanks from oxidic magnetic material and sintering these blanks so as to obtain a finished magnet member it will be learned whether under all circumstances the radius or radii of curvature of the faces of the magnet member blanks decreases and to what extent. The radius of the inner face of the magnet member blank can always be made somewhat larger than the radius of the outer surface of the pole member 11, but the radius of the outer face of the magnet member blank may have to be made in some cases slightly smaller than the inner radius of the supporting member 10, and in other cases it may even be made slightly larger than the last mentioned radius. The essential point to be kept in mind is to arrange matters in such a manner that in the finished magnet member the radius of the outer face of the magnet member never exceeds the radius of the inner surface of the supporting member 10, and that the radius of the inner face of the magnet member is at least equal to the radius of the outer surface of the pole member 11. By spacing the axes of the faces of the magnet member properly the above mentioned difference in thickness between the center portion and the remaining portion of the magnet member is to be achieved.

It will be understood that each of the elements described above or two or more together, may also find a useful application in other types of a magnet member.

a magneto rotor and a method for manufacturing the latter differing from the types described above.

While the invention has been illustrated and described as embodied in a magnet member, a magneto rotor and a method for manufacturing the latter out of an annular support member, a pole member and a magnet member, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A magneto rotor, comprising, in combination, an annular support member having a cylindrical inner surface of a predetermined first radius and having a first axis; a pole member shaped substantially as a segment of a cylinder and having an outer surface of a predetermined second radius and having a second axis parallel with said first axis; and a magnet member consisting of a material subject to shrinkage and being of predetermined width and length, curved in longitudinal direction and bounded transversely by an outer cylindrical surface portion having a third predetermined radius not exceeding said first radius and having a third axis parallel with said first and second axes, and by an inner cylindrical surface portion having a predetermined fourth radius smaller than said third radius and at least equal to said second radius and having a fourth axis, said third and fourth axes being parallel with each other and spaced from each other a distance of such magnitude that the radial thickness of said magnet member is greater in the center area thereof than on both sides thereof, said magnet member being fitted between said inner surface of said support member and said outer surface of said pole member, whereby the magnet member will be engaged by said surfaces of said support member and of said pole member, respectively, always at least in said center area, and any space left between the cylindrical surfaces of the magnet member and the respectively adjacent surfaces of the support and pole members as a result of shrinkage of said magnet member will be restricted to surface portions spaced from said center area of the magnet member so that radial pressures on said magnet member will always bear upon the center area supported by said support member and said pole member.

2. A magneto rotor, comprising, in combination, an annular support member having a cylindrical inner surface of a predetermined first radius and having a first axis; a pole member shaped substantially as a segment of a cylinder and having an outer surface of a predetermined second radius and having a second axis parallel with said first axis; and a magnet member consisting of a material subject to shrinkage and being of predetermined width and length, curved in longitudinal direction and bounded transversely by an outer cylindrical surface portion having a third predetermined radius not exceeding said first radius and having a third axis parallel with said first and second axes, and by an inner surface portion having a predetermined fourth radius smaller than said third radius and at least equal to said second radius and having a fourth axis, said third and fourth axes being parallel with each other and spaced from each other a distance of such magnitude that the radial thickness of said magnet member is greater in the center area thereof than on both sides thereof, the difference of radial thickness between said first and second surface portions in the area at the outer ends of the magnet member as against said greater thickness in the center area thereof being within a range of up to 12% of said greater thickness, said magnet member being fitted between said inner surface of said support member and said outer surface of said pole member, whereby the magnet member will be engaged by said surfaces of said support member and of said pole member, respectively, always at least in said center area, and any space left between the cylindrical surfaces of the magnet member and the respectively adjacent surfaces of the support and pole members as a result of shrinkage of said magnet member will be restricted to surface portions spaced from said center area of the magnet member so that radial pressures on said magnet member will always bear upon the center area supported by said support member and said pole member.

3. A magnet member consisting of a material subject to shrinkage and being of predetermined width and length, curved in longitudinal direction and bounded transversely by a first outer cylindrical surface portion having a first predetermined radius and a first axis, and by a second, inner cylindrical surface portion having a predetermined radius smaller than said first radius and a second axis, said first and second axes being parallel with each other and spaced from each other a distance of such magnitude that the radial thickness of said magnet member is greater in the center area thereof than in the areas on both sides thereof, so that if the magnet member is fitted with its curved surface portions between adjoining members having each a cylindrical contacting surface, respectively, with axes parallel to said first and second axes, one of said contacting surfaces having a radius at least equal to said first radius of said outer surface of the magnet member, the other contacting surface having a radius not exceeding said second radius of said inner surface of the magnet member, the magnet member will be engaged by said contacting surfaces of said adjoining members always at least in said center area, and any space that may be left between the cylindrical surfaces of the magnet member and the respectively adjacent contacting surfaces of the adjoining members as a result of shrinkage of said magnet member will be restricted to surface portions spaced from said center area of the magnet member so that radial pressures on said magnet member will always bear upon the center area supported by said respectively adjacent adjoining members.

4. A magnet member consisting of a material subject to shrinkage and being of predetermined width and length, curved in longitudinal direction and bounded transversely by a first, outer cylindrical surface portion having a first predetermined radius and a first axis, and by a second, inner cylindrical surface portion having a predetermined radius smaller than said first radius and a second axis, said first and second axes being parallel with each other and spaced from each other a distance of such magnitude that the radial thickness of said magnet member is greater in the center area thereof than in the areas on both sides thereof, the difference of radial thickness between said first and second surface portions in the area at the outer ends of the magnet member as against said greater thickness in the center area thereof being within a range of up to 12% of said greater thickness, so that if the magnet member is fitted with its curved surface portions between adjoining members having each a cylindrical contacting surface, respectively, with axes parallel to said first and second axes, one of said contacting surfaces having a radius at least equal to said first radius of said outer surface of the magnet member, the other contacting surface having a radius not exceeding said second radius of said inner surface of the magnet member, the magnet member will be engaged by said contacting surfaces of said adjoining members always at least in said center area, and any space that may be left between the cylindrical surfaces of the magnet member and the respectively adjacent contacting surfaces of the adjoining members as a result of shrinkage of said magnet member will be restricted to surface portions spaced from said center area of the magnet member so that radial pressures on said magnet member will always bear upon the center area supported by said respectively adjacent adjoining members.

References Cited by the Examiner

UNITED STATES PATENTS

| | | | |
|---|---|---|---|
| 1,147,038 | 7/1915 | Mueller | 310—153 |
| 2,472,313 | 6/1949 | Phelon | 310—153 |
| 2,538,534 | 1/1951 | Phelon | 310—153 |
| 2,627,041 | 4/1951 | Phelon | 310—74 |
| 2,756,356 | 7/1956 | Brownlee et al. | 310—153 |
| 2,806,156 | 9/1957 | Phelon | 310—153 |
| 2,812,458 | 11/1957 | Mennesson | 310—153 |
| 2,976,439 | 3/1961 | Kiekhaefer | 310—153 |
| 3,052,958 | 9/1962 | Anderson | 29—155.53 |
| 3,077,026 | 2/1963 | Blackburn | 29—155.53 |

FOREIGN PATENTS 1,073,602  1/1960  Germany.

ORIS L. RADER, *Primary Examiner.*

MILTON O. HIRSHFIELD, *Examiner.*

J. J. SWARTZ, *Assistant Examiner.*